United States Patent Office 3,300,194
Patented Jan. 24, 1967

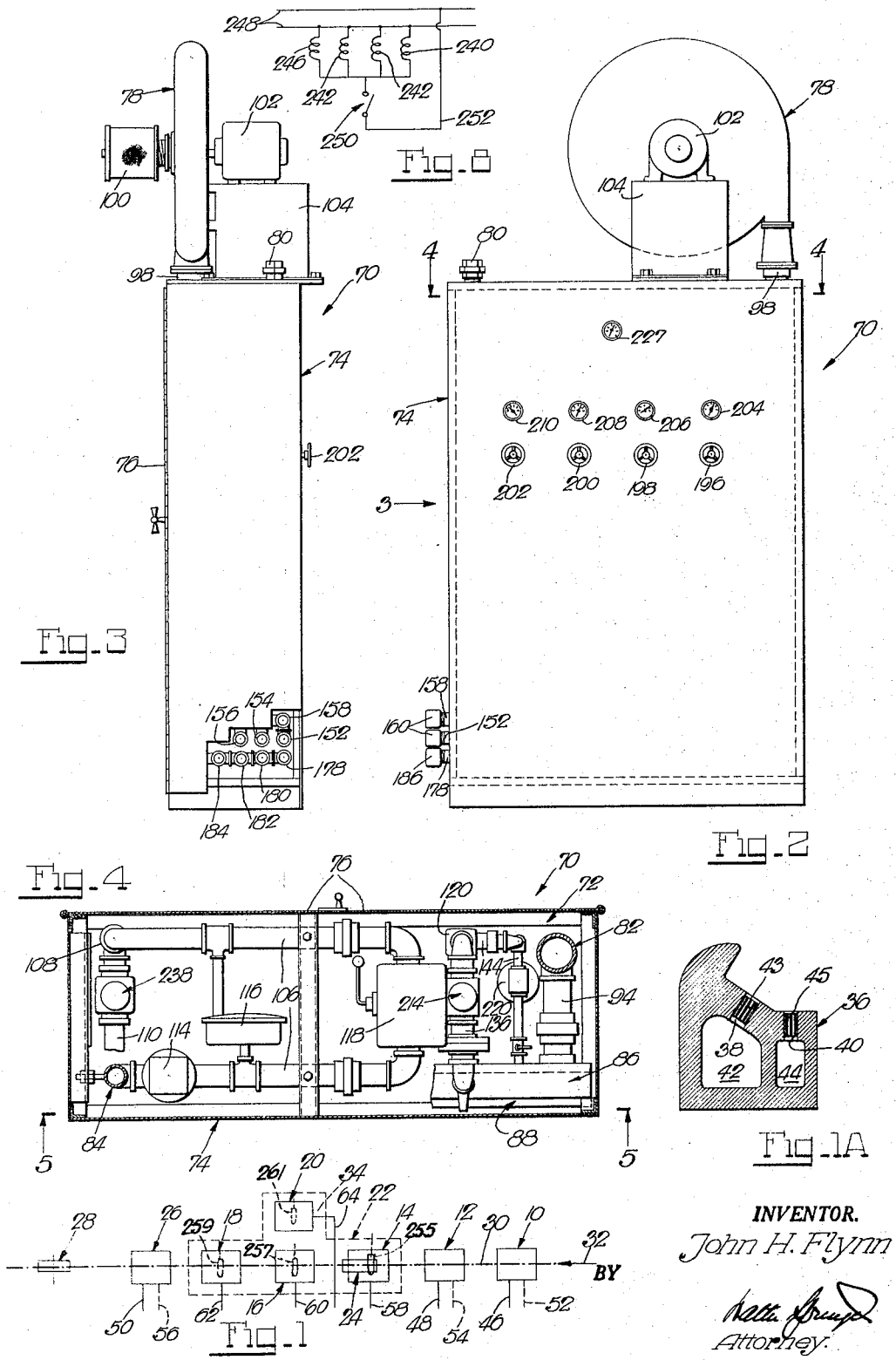

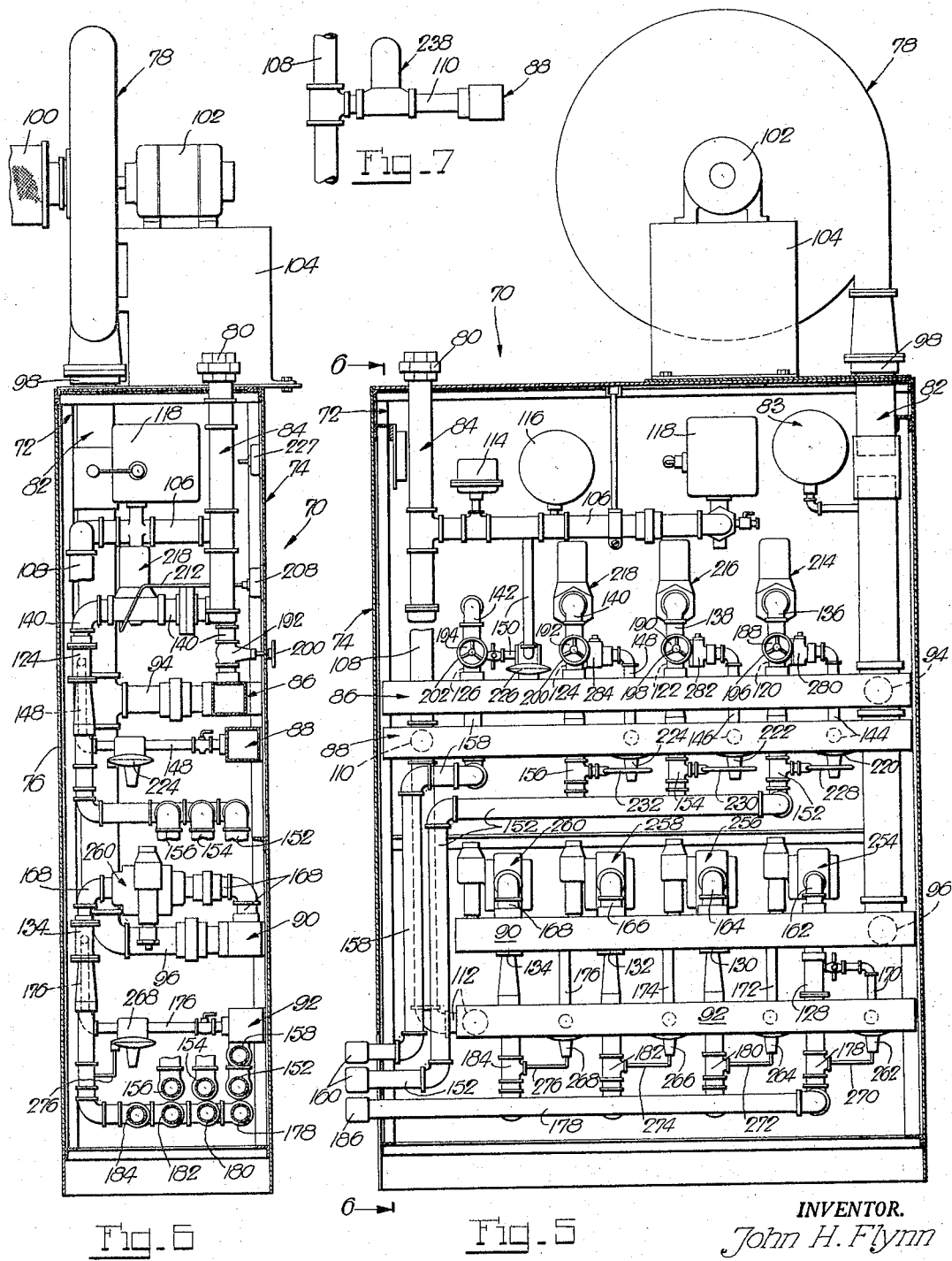

3,300,194
CONTROL FOR MULTIPLE GAS BURNER
INSTALLATION
John H. Flynn, 234 Elk Ave., New Rochelle, N.Y. 10804
Filed July 2, 1964, Ser. No. 379,799
13 Claims. (Cl. 263—6)

This invention relates in general to industrial multiple gas-burner installations, and more particularly to the controls of such burner installations.

The present invention is concerned with the controls of multiple gas-burner installations especially, though not exclusively, for can lines in which the side joints of tubular can bodies are sealed by solder application. The side joints of these can bodies are customarily formed by interfolded side margins thereof, and they are sealed by wiping them against a driven solder application roll which dips into a solder bath and conveys solder to the joints for capillary distribution throughout. The usual can line employs a series of gas burners starting with preheat burners, continuing with solder melt burners, and ending with a prewipe burner, and the can bodies are by a conveyor continuously fed in end-to-end relation first past the preheat burners, then over and beyond the solder application roll and finally past the prewipe burner and a wiping wheel therebeyond. The flames from the preheat burners brush the passing can bodies first on opposite sides of, and then at, their joints in order to bring the latter, without body warpage, to proper temperature for capillary solder distribution throughout on their subsequent solder pick-up from the application roll, and the flames from the next continuing burners heat several zones of the solder bath for the purpose of keeping a relatively large supply of molten solder available and maintaining the molten solder at the application roll at most uniform temperature, while the flames from the prewipe burner brush the passing can bodies on opposite sides of their joints for running off solder which has spread thereat on the preceding solder application to the joints. The joints themselves are finally wiped clean of excess solder on the pass of the can bodies past the wiping wheel.

While the burner installations in can lines perform generally satisfactory, they are deficient in a few, but important, respects. Thus, occasional can body jams in the line are inevitable especially at present high speeds of the body conveyors, which calls for immediate stoppage of the conveyors to keep the extent of the jam at a minimum. Sudden stoppage of the conveyors for this reason, or for any other reason such as power failure, for instance, also requires immediate extinction of the flames from at least the "action" burners, i.e., the body-treating preheat and prewipe burners, in order to avoid burning of the can bodies nearest thereto. To this end, it is the universal practice to provide for instantaneous shut-off of the gas lines to the usual air-gas pre-mixers for the action burners and to leave the combustion air lines to these mixers open. However, while this achieves the desired result of extinction of the flames from the action burners, it also supplies these customarily flame-piloted burners, on reopening of the gas lines, with an air-gas mixture which produces inferior flame for the length of time required for self-restoration of the correct air-gas ratio of the supply mixture, with the result that on the restart of the body conveyor a number of can bodies will be lost either by undergoing incomplete sealing of their joints or by being burnt, depending on the timing of the conveyor start relative to the turn-on of the burners.

Another aspect of the burner installations in can lines is the arrangement of the fuel controls and pre-mixers in accustomed manner in fairly close proximity to certain groups and/or individual ones of the burners with which they are associated. While this arrangement of the burners and their respective fuel controls and pre-mixers in separate units is considered good practice from the standpoint of affording ready control over and maintenance of these individual units as well as attaining proper flame characteristics with the least lag after flame ignition at the burners, it does involve a maze of piping to, and numerous controls and pre-mixers in, the immediate vicinity of the can line which has its disadvantages. Thus, there is so much exposed piping leading to the can line that leaks must not only be expected, but do occur, from time to time. Even more important, this arrangement of the burner installation not only tends to detract from, and to some extent even interferes with, close supervision of the line's operation, but also makes it a difficult and time consuming task correctly to adjust the fuel controls in case of required flame adjustment throughout or of a substantial part of the burner installation from any cause, such as adaptation of the line to different can bodies or variations in the calorific power of the supply gas, for instance.

It is among the objects of the present invention to provide in a burner installation for a can line or the like fuel controls that may be actuated so that all action burners will simultaneously be shut-off or turned-on, and which are so arranged that, as long as the air to gas ratio of the combustible mixture for any one of these burners remains set and this mixture has a set volumetric flow rate to the burner, the flames therefrom have the same exact characteristics during burner operation including, quite importantly, at the very moment or moments of reigniting the flames after any number of extinctions thereof for any length of time. In so arranging the fuel controls, the flames from these action burners are never inferior but always right for the operation and, hence, may be reignited simultaneously with a restart of the conveyor for any reason, such as starting the line for a production run or on restoration of order after a can body jam somewhere in the line, for example, without losing any can bodies through either burning or incomplete sealing of their joints.

It is another object of the present invention to provide a burner installation for a can line or the like of which the fuel controls and premixers for the various burners are arranged at a centralized station in the first place, and are assembled in a single self-contained service unit in the second place. In thus arranging the fuel controls and pre-mixers in a single service unit, the unit may be located, on the one hand sufficiently close to the can line for ready observation of the line's operation by an attendant at the controls, and on the other hand sufficiently remote from any components of the line to afford an attendant ready access thereto, and all the conduits leading from this unit to the can line are but the few that conduct combustible mixture to the burners.

It is a further object of the present invention to provide a burner installation for a can line or the like in which the pre-mixers and their individually associated fuel controls in the aforementioned service unit are arranged in two separated groups for the solder melt burners and the action burners, respectively, in the line, and the pre-mixers in these groups are supplied with combustion air and gas from pairs of air and gas manifolds, respectively, which in turn are supplied from single air and gas mains, respectively, in the unit. With this arrangement, the pre-mixers and associated fuel controls in both groups are, for any and all purposes, identified with the burners they serve as readily as though they were located next to them, and the service unit requires but single connections with a gas main and an available source of compressed air, respectively. Further, the connections between the pre-mixer, fuel control, and other operating, components of the service unit may be kept as short as is consistent with arranging these components for their ready view and ready access for their maintenance and also repair or replacement when necessary, as well as for manipulation of those components that provide for adjustability or setting, whereby the service unit may also be kept at a reasonable size and weight.

Another object of the present invention is to install the operating components and interconnections of the aforementioned service unit in an upright cabinet in which they are enclosed and, hence, protected from dust and dirt, but are readily accessible through a normally closed door of the cabinet, with the only essential elements of the unit on the outside of the cabinet being advantageously short ends of the few air-gas mixture supplying conduits for their ready releasable coupling to other conduits leading to the various burners, and the handles of air-pressure regulating valves as well as indicators of the regulated air pressures whereby to undertake, on simple manipulation of any one or more of these handles, changes in the pressure of the combustion air passing to the pre-mixers for the respective action burners and in this simple fashion permit quick adjustments of the flames at any one or more of the action burners with that high accuracy which is best gauged from observation of the flames' effects on can bodies as they travel in normal conveyance past these flames with the least likelihood of becoming spoiled thereby.

A further object of the present invention is to provide the aforementioned cabinet-housed service unit with its own source of combustion air in the form of an air blower which is advantageously mounted on top of the cabinet not only to be out of the way but also to draw air which is substantially free from dust and other impurities and also products of combustion at the can line.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a diagrammatic illustration of a can line or the like, including the line's burner arrangement;

FIG. 1A is a section through one of the burners involved;

FIG. 2 is a front view of a featured service unit of the line's burner arrangement;

FIG. 3 is an end view of the featured service unit as seen in the direction of arrow 3 in FIG. 2;

FIG. 4 is an enlarged section through the featured service unit taken substantially on the line 4—4 of FIG. 2;

FIG. 5 is another section through the featured service unit taken substantially on the line 5—5 of FIG. 4;

FIG. 6 is still another section through the featured service unit taken substantially on the line 6—6 of FIG. 5;

FIG. 7 is a fragmentary view of certain elements of the featured service unit; and FIG. 8 is a wiring diagram of a certain electrical control of the featured service unit.

The exemplary can line in FIG. 1 has in this instance preheat burners 10 and 12, solder-melt burners 14, 16, 18 and 20 beneath a solder bath 22 with a solder-application roll 24, a prewipe burner 26, and a wiping wheel 28. Tubular can bodies are by a conveyor carried end-to-end along the dot-and-dash line 30 in the direction of the arrow 32 past the preheat burners 10 and 12, over the solder application roll 24, thence past the prewipe burner 26 and finally over the wiping wheel 28. The functions of the preheat and prewipe burners 10, 12, 26 and of the solder-application and wiping rolls 24, 28 have been described earlier. The flames from the solder-melt burners 14 to 20 heat several zones, including a solder premelt zone 34, of the solder bath 22 to the end of having a large supply of molten solder available in the bath and keeping the molten solder in the vicinity of the application roll 24 at most uniform temperature. The preheat and prewipe burners 10, 12 and 26, appropriately termed "action burners," are preferably of pilot-lighted mainflame type and, hence, have separate passages through which to supply the main and pilot flame ports of the burners with a combustible air-gas mixture. The action burners 10, 12 and 26 are customarily arranged in pairs on opposite sides of the conveyor line 30 and have their flames directed against the proper places on the passing can bodies, with these burners being either of ribbon type or of open-flame type or a combination of both types. FIG. 1A shows an exemplary ribbon-type burner having in its casing 36 burner slots 38 and 40 which are in communication with main and pilot passages 42 and 44, respectively, and receive main and pilot flame ribbon assemblies 43 and 45, respectively, with the passages 42 and 44 being supplied with a combustible air-gas mixture through suitable supply conduits. Thus, the action burners 10, 12 and 26 have their main and pilot passages supplied with a combustible air-gas mixture through main conduits 46, 48, 50 and pilot conduits 52, 54 and 56 (FIG. 1). The solder-melt burners 14 to 20 are in this instance of electrode-ignition type and, hence, have only single passages to the flame ports, with these passages receiving a combustible air-gas mixture through conduits 58, 60, 62 and 64 (FIG. 1).

Reference is now had to FIGS. 2 to 6 which show a service unit 70 of the present invention for use with the burner installation in the exemplary can line of FIG. 1. The service unit 70 comprises an upright frame 72 which is articulated from suitable structural steel parts, primarily angles, and is preferably installed in an upright cabinet 74. The frame 72 carries the various operating components of the unit 70, and these components are readily accessible for any purpose whatever through hinged doors 76 in back of the cabinet 74.

The service unit 70, which is self-contained, is characterized in that it has installed virtually all the elements for supplying the various burners in the line with combustible air-gas mixture and for regulating their performance, including flame characteristics, with the service unit being in this instance even provided with its own source of combustion air in the form of an air blower 78, and having a single connector 80 with a gas supply line, and the only conduit connections required between the service unit and the various burners are those that supply the latter with combustible air-gas mixture. To this end, the unit 70 includes air and gas mains 82 and 84 and two sets of air and gas manifolds 86, 88 and 90, 92 which are associated with the action and solder-melt burners, respectively. The air main 82, which is arranged in the rear part and near one end of the cabinet and connected with a conventional air-pressure switch 83, is by conduits 94 and 96 connected with the respective air manifolds 86 and 90 which, like the gas manifolds 88 and 92, are suitably mounted in the cabinet at the front thereof. The air main 82 extends a short distance beyond the top of the cabinet and is there connected, releasably or permanently, with the output end 98 of the air blower 78 on top of the cabinet. The air blower 78 has a screened inlet 100 and is operated by an electric motor 102 on a mounting bracket 104 on top of the cabinet. The gas main 84, which is arranged in the front part and near the other end of the cabinet, extends a short distance beyond the top of the cabinet and is there provided with the union 80 for its connection with a gas supply line. Branching from the gas main is a generally U-shaped horizontal conduit 106 that continues as a vertical conduit 108 which at the levels of the gas manifolds 88 and 92 has therewith conduit connections 110 and 112, respectively (FIGS. 4, 5 and 7). Interposed in the horizontal conduit 106 are such conventional controls as gas underpressure and overpressure limit switches 114 and 116 and a manual safety main shut-off valve 118.

There are further provided two groups of air-gas premixers, or simply mixers, 120 to 126 and 128 to 134 which are associated with the action and solder-melt burners, respectively. These mixers are of well-known venturi-type having air and gas inlets and an air-gas mixture outlet. The air manifold 86 is connected with the air inlets of the nearby side-by-side arranged mixers 120 to 126 of the one group through conduits 136, 138, 140 and 142, respectively (FIGS. 5 and 6), while the gas manifold 88 is connected with the gas inlets of the mixers 120 to 124 of this group through conduits 144, 146 and 148, respectively (FIGS. 4 to 6), with the gas inlet of the remaining mixer 126 being connected with the horizontal gas conduit 106 through a conduit 150 (FIG. 5). The outlets of the mixers 120 to 126 of this group are connected to discharge conduits 152 to 158, respectively (FIGS. 5 and 6), which in this instance project a short distance beyond one end of the cabinet 74 and there carry unions 160 for their releasable connection with the conduits 46 to 56 that lead to the action burners 10, 12 and 26 (FIG. 1).

The mixers 128 to 134 of the other group, which are also arranged side-by-side but advantageously located remote from, and in this instance below, the mixers of the first group, have their air inlets connected with the nearby air manifold 90 through conduits 162 to 168, respectively, and have their gas inlets connected with the nearby gas manifold 92 through conduits 170 to 176, respectively (FIGS. 5 and 6). The outlets of these mixers 128 to 134 are connected to discharge conduits 178 to 184, respectively, which also project a short distance beyond the end of the cabinet and there carry unions 186 for their releasable connection with the conduits 58 to 64 that lead to the solder-melt burners 14 to 20 (FIG. 1).

Reverting to the mixers 120 to 126 of the first group associated with the action burners 10, 12 and 26, their air supply conduits 136 to 142 have interposed air-flow regulating valves 188 to 194, respectively, which for their adjustment are provided with handles 196 to 202, respectively, that are advantageously arranged in front of the cabinet for their ready manipulation thereat by an attendant (FIGS. 2, 5 and 6). To facilitate proper adjustment of the individual air-flow regulating valves 188 to 194, there are associated therewith air-pressure gauges 204 to 210, respectively, which are readable on the outside of the cabinet (FIG. 2) and connected with the respective air supply conduits 136 to 142 through pilot lines 212 of which the one connecting conduit 140 and gauge 208 is shown in FIG. 6. Thus, with the gauges 204 to 210 connected with the respective air conduits 136 to 142 between their associated valves 188 to 194 and mixers 120 to 126, it stands to reason that the gauges 204 to 210 indicate, by way of air pressure, the volumetric flow rate of the air passing into the respective mixers as adjusted by the respective regulating valves 188 to 194. Further interposed, significantly in but three of these four air supply conduits, namely in the conduits 136, 138 and 140, are solenoid valves 214, 216 and 218, respectively, which are normally closed, but open on energization of their solenoids. The gas conduits 144 to 150 leading to the respective mixers 120 to 126 of this first group have interposed conventional zero-pressure gas valves 220 to 226, respectively (FIGS. 5 and 6), which are well-known diaphragm-type valves that keep the pressure of their output gas substantially at atmospheric pressure, with the pressure of the gas admitted into the gas manifold 88 being initially adjusted by a gas-pressure reducing regulator (not shown) in the gas main 84 and this adjusted gas pressure indicated by a gauge 227 which is readable at the front of the cabinet (FIG. 2). Part of these zero-pressure valves, namely those identified by the reference numerals 220, 222 and 224, are preferably connected through balancing tubes 228, 230 and 232 with the associated discharge conduits 152, 154 and 156 (FIG. 5), whereby these zero-pressure valves are subjected to the pressures of the air-gas mixtures in the associated discharge conduits to the end of increasing the pressure of their output gas with increasing back-pressure of the air-gas mixtures so that the main flames at the action burners supplied with the respective mixtures will retain their adjusted characteristics. In this connection, the discharge conduits 152, 154 and 156, which are thus connected through the balancing tubes 228 and 232 with the associated zero-pressure gas valves 220 to 224, are through the conduits 46, 48 and 50 (FIG. 1) connected with the main passages in the respective action burners 10, 12 and 26 for supplying air-gas mixture to the main flames therefrom that actually brush the passing can bodies in the exemplary can line, which explains the preferred close control over the characteristics of these main flames at varying back pressures of their supply mixtures. On the other hand, there is no need for providing a balancing tube connection between the discharge conduit 158 and associated zero-pressure gas valve 126 because this discharge conduit is through the conduits 52, 54 and 56 (FIG. 1) connected with the pilot passages in all action burners for supplying air-gas mixture to the pilot flames thereat which evidently require no such close control over their characteristics as the main flames thereat.

As already mentioned, only the air supply conduits 136 to 140 to the mixers 120 to 124 of the combustible gas for the main flames at the action burners 10, 12 and 26 have the respective interposed solenoid valves 214, 216 and 218 (FIG. 5), while the air supply conduit 142 to the remaining mixer 126 of the combustible gas for the pilot flames at the action burners is without an interposed solenoid valve. Accordingly, on simultaneously deenergizing the solenoids of the valves 214 and 218 in a manner described hereinafter and thereby closing the latter, the associated mixers 120 to 124 are shut off from the combustion air and, hence, are inoperative with ensuing extinction of the main flames at the action burners 10, 12 and 26 in any event. Further, there is interposed in the conduit connection 110 between the gas line 108 and gas manifold 88 another solenoid valve 238 (FIG. 7) which is normally closed, but is opened on energization of its solenoid. Accordingly, with the mixers 120 to 124 being supplied with gas from the manifold 88, they will, on simultaneous deenergization of the solenoids of their associated air valves 214 to 218 and of the gas valve 238 and, hence, closure of all of these valves, be deprived not only of air but of gas as well. On the other hand, the remaining mixer 126 of the combustible gas for the pilot flames of the action burners, being supplied with air from the manifold 86 and with gas from the supply line 106, will continue to receive air and gas even on closure of the solenoid air and gas valves 214 and 218 and 238, with the result that the pilot flames at the action burners will remain lighted regardless of whether or not the main flames thereat are lighted or extinguished.

The active coils of the solenoids of the air and gas valves 214, 216, 218 and 238 are denoted by the reference numerals 240, 242, 244 and 246 in the wiring diagram in FIG. 8 in which they are shown in parallel connection with one side of a suitable power line 248 and a switch 250 which through a lead 252 is connected with the other side of the power line, with all coils being simultaneously energized and deenergized on opening and closing the switch 250.

Reverting now to the mixers 128 and 134 of the second group for the solder-melt burners 14 to 20, their air supply conduits 162 to 168 have interposed conventional throttle-type air-flow temperature control valves or units 254, 256, 258 and 260, respectively, which are connected with conventional temperature control bulbs 255, 257, 259 and 261, respectively, that dip into the several zones in the solder bath 22 served by the respective burners 14 to 20 (FIG. 1), with the control units 254, 256, 258 and 260 responding to temperature variations of the solder in the respective bath zones to regulate the volumetric flow rate of the air through the 128 to 134 mixers, to the end of regulating the air-gas mixture for these individual burners so as to keep the temperature of the solder in the respective bath zones substantially uniform. Interposed in the gas supply conduits 170 and 176 to these mixers are zero-pressure gas valves 262, 264, 266 and 268, respectively (FIGS. 5 and 6), which may through balancing tubes 270 to 276 be connected with the discharge conduits 178 to 184 of the respective mixers 128 to 134. The grouped discharge conduits 178 to 184 are through the conduits 58 to 64 (FIG. 1) connected in this instance with the solder-melt burners 14, 16, 18 and 20, respectively.

The service unit 70, which is preferably installed in close proximity to the exemplary can line (FIG. 1) without obstructing ready access to the operating components thereof yet affording an attendant at the unit 70 a clear view of all aspects of the line's operation, forms a unique central control station at which an attendant may advantageously undertake such adjustments of the performance of the individual burners as may be indicated from time to time from observing the line's operation. In this connection, the flames from the solder-melt burners 14 to 20, after being once adjusted in their characteristics for a particular line operation, hardly ever require adjustment during actual line operations, but the body-brushing main flames from the action burners 10, 12 and 26 should for best results be fine-adjusted from time to time during line operation which almost invariably involves only quantitative regulation of the air-gas mixture for varying brushing intensity of these main flames on the passing can bodies. This latter task may be performed readily and accurately by an attendant at the service unit who by appropriate manipulation of any of the handles 196, 198 or 200 in front of the cabinet (FIG. 2) adjusts the associated air-flow regulating valve in the cabinet and thereby inches the main flames from the respective burner into optimum effectual brushing intensity with the passing can bodies by actually observing these main flames and their effect on the bodies. Of course, qualitative regulation of the air-gas mixture for the main flames from the action burners will also be required occasionally, especially on adapting these burners to different can bodies that require different heating by the brushing main flames which in many instances cannot be achieved by mere regulation of the brushing intensity of the latter on these bodies. Qualitative regulation of the air-gas mixture for the main flames from the action burners is readily achieved by adjustment of plug-type valves 280, 282 and 284 in the gas conduits 144 to 148 leading to the respective mixers 120 to 124, thereby changing the air-gas ratio in these mixers. Having once undertaken approximately correct qualitative regulation of the air-gas mixture for the main flames from the action burners for a run of different can bodies requiring different heating, for example, further qualitative regulation of these air-gas mixtures to optimum accuracy for best results, if need be, may be undertaken while the line is in operation, with these main flames being then also quickly adjusted in their brushing intensity on the passing can bodies in the earlier described manner. Accordingly, control over the characteristics of the main flames at the action burners from the central station of the service unit for a different run or runs of can bodies or during any line operation is highly facile and accurate. Moreover, the air-gas mixture supply to each individual action burner may be set independently and without affecting the air-gas mixture supply to any other action burner, and the same holds true of the solder-melt burners, while any and all adjustments of the air-gas mixture supplies to the action burners in no wise affect the air-gas mixture supplies to the solder-melt burners, and vice versa.

The service unit 70 and the described arrangement of its operating components, including the air and gas solenoid valves 214 to 218 and 238, is of further advantage in preventing, or at least greatly reducing, the loss of can bodies through burning or incomplete sealing of their joints when the can line has to be stopped and restarted for any reason. Thus, instantaneous extinction of the main flames, without extinction of the pilot flames, from the action burners 10, 12 and 26 on simple manipulation of the switch 250 (FIG. 8) is particularly advantageous in the event of a body jam somewhere in the line, if for no other reason that burning of any can bodies may thereby be prevented. There is this further advantage, however, that on a restart of the line, either for a day's operation or after cleaning up a body jam in the line, the flame-piloted main flames from the action burners will go on simultaneously on closing the switch 250 (FIG. 8), so that on proper timing of the closing of this switch with the restart of the line, and more particularly of the body conveyor, virtually no can bodies will be lost through burning or incomplete sealing of their joints. There is this further important advantage that on turning on the main flames at the action burners they have at the very moment of their ignition the same identical characteristics in every respect which they had prior to their last extinction. This is due to the arrangement of the air and gas solenoid valves 214 to 218 and 238 and their simultaneous operation by the switch 250, whereby on simultaneous closure of these valves air and gas flow to the mixers 120 to 124 is simultaneously interrupted, and there remains trapped in the lines from these mixers to, and also within, the main passages in the respective action burners mixture of the correct air-gas ratio at atmospheric pressure which on simultaneous reopening of the solenoid valves is instantaneously augmented with mixture at the correct operation flow rate and of the correct operational air-to-gas ratio. This feature goes far in permitting turn-on of the main flames from the action burners virtually simultaneously with a restart of the body conveyor with an excellent chance of losing not even a few can bodies through burning or incomplete sealing of their joints.

While the featured burner arrangement with the service unit is herein demonstrated in connection with an exemplary can line, it is, of course, fully within the purview of the present invention to use the same in any other line requiring similar flame treatment of the parts being produced.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A service unit for a plurality of gas burners disposed along a production line for parts to be contacted by the burner flames, comprising a condensed frame; air and gas manifold elements; venturi-type air-gas mixer elements equal in number to said burners, with each mixer element having air and gas inlets and an outlet; air and gas conduit elements connected at one end with said air and gas manifold elements, respectively, and having at their other ends releasable conduit connector means; air line elements connecting said air manifold element with said air inlets of said mixer elements, respectively; gas line elements connecting said gas manifold element with said gas inlets of said mixer elements, respectively; zero-pressure gas valve elements interposed in said gas line elements, respectively; gas and air shut-off valve elements interposed in said gas conduit element and in said air line elements, respectively; a control for simultaneously opening and closing said shut-off valve elements; and burner-supplying conduit elements connected at one end with said outlets of said mixer elements, respectively, and having at their other ends releasable conduit connector means, all of said elements being mounted on said frame and forming therewith a self-contained unit, with all of said elements and releasable conduit connector means being arranged in sufficiently close proximity to each other to be individually accessible but removed from the burners they are adapted to serve substantially as far as said frame is removed from the burners.

2. A service unit for gas burners disposed along a production line for parts to be contacted by pilot-lighted main flames from the burners, comprising a frame; air and gas manifold elements; venturi-type air-gas mixer elements exceeding the number of burners by one and each having air and gas inlets and an outlet; air and gas conduit elements connected at one end with said air and gas manifold elements, respectively, and having at their other ends releasable conduit connector means; a first air line element connecting said air manifold element with the air inlet of one of said mixer elements; second air line elements connecting said air manifold element with the air inlets of the remaining mixer elements, respectively; a first gas line element connecting said gas conduit element with the gas inlet of said one mixer element; second gas line elements connecting said gas manifold element with the gas inlets of said remaining mixer elements, respectively; first air valve elements interposed in said second air line elements, respectively; a first gas valve element interposed in said gas conduit element between said gas manifold element and first gas line element; zero-pressure gas valve elements interposed in said gas line elements, respectively; burner-supplying conduit elements connected at one end with said outlets of said mixer elements, respectively, and having at their other ends releasable conduit connector means; and control elements operable to cause simultaneous opening and closing of said first valve elements, with all of said elements being carried by said frame and forming therewith a self-contained unit.

3. A service unit as set forth in claim 2, which further comprises a cabinet housing said unit.

4. A service unit as set forth in claim 2, which further comprises a cabinet with a door in which said unit is housed and normally concealed, with said other ends of said conduit elements projecting outside said cabinet for ready access thereto.

5. A service unit as set forth in claim 2, which further comprises an upright cabinet with a door in which said unit is housed and normally concealed; and an air blower mounted on top of said cabinet and connected with said other end of said air conduit element, with said other ends of said other conduit elements projecting outside said cabinet for ready access thereto.

6. A service unit as set forth in claim 2, which further comprises a cabinet with a door in which said unit is housed and normally concealed; air-flow regulating valves in said air line elements, respectively, having operating handles on the outside of said cabinet; and air-pressure gauges readable on the outside of said cabinet and connected with said air line elements, respectively, between the air inlets of said mixer elements and said regulating valves, with said other ends of said conduit elements projecting outside said cabinet for ready access thereto.

7. A service unit as set forth in claim 6, in which the cabinet is upright, and there is further provided an air blower mounted on top of said cabinet and connected with said other end of said air conduit element.

8. A service unit for action and solder-melt gas burners along a can body line, with the action burners having pilot-lighted main flames, comprising an upright cabinet; and an assembly mounted and contained in said cabinet and including, first and second groups of air-gas mixers associated with said action and solder-melt burners, respectively, of which the mixers of said first group exceed the number of action burners by one and the mixers of said second group are equal in number to said solder-melt burners, and each mixer has air and gas inlets and an outlet, first and second air and gas manifolds, air and gas mains connected with said air manifolds and with said second gas manifold, respectively; a gas conduit connecting said gas main with said first gas manifold, one first air line connecting said first air manifold with the air inlet of one mixer of said first group, other first air lines connecting said first air manifold with the air inlets of the remaining mixers, respectively, of said first group, first valves interposed in said gas conduit and in said other first air lines, respectively, one first gas line connecting said gas main with the gas inlet of said one mixer of said first group, other first gas lines connecting said first gas manifold with the gas inlets of said remaining mixers, respectively, of said first group, said second air manifold being connected with the air inlets of the mixers, respectively, of said second group, second gas lines connecting said second gas manifold with the gas inlets of the mixers, respectively, of said second group, zero-pressure valves interposed in all of said first and second gas lines, air-gas mixture supply conduits leading from the outlets of all mixers, respectively, and control means operable to cause simultaneous opening and closing of said first valves, with said mains and supply conduits projecting outside said cabinet and there having releasable conduit connector means.

9. A service unit as set forth in claim 8, which further comprises an air blower mounted on top of said cabinet and connected with said air main.

10. A service unit as set forth in claim 8, which further includes air-flow regulating valves in said first air lines, respectively, having operating handles on the outside of said cabinet, and air-pressure gauges readable on the outside of said cabinet and connected with said first air lines respectively, between the air inlets of the mixers of said first group and said first air manifold.

11. A service unit as set forth in claim 8, in which said supply conduits project outside said cabinet near the bottom thereof and are there closely grouped in substantial parallelism with each other, and said mains project outside said cabinet at the top thereof.

12. In a production line for parts including flame-treatment thereof, the combination with gas burners along the line having pilot-lighted main flames and pilot and main passages leading to the respective pilot and main flames, and a conveyor for carrying parts past said burners in contact with the main flames therefrom, of venturi-type air-gas mixers each with air and gas inlets and an outlet, of which the outlet of one mixer is connected with said pilot passages of all of said burners and the outlets of the remaining mixers are connected with said main passages of said burners, respectively; gas and air manifolds; gas and air conduits leading to said gas and air manifolds for supplying them with compressed gas and air, respectively; first air lines connecting said air manifold with said air inlets of said remaining mixers, respectively; a second air line connecting said air manifold with said air inlet of said one mixer; first gas lines connecting said gas manifold with said gas inlets of said remaining mixers, respectively; a second gas line connecting said gas conduit with said gas inlet of said one mixer; first air valves interposed in said first air lines, respectively; a first gas valve interposed in said gas conduit between said second gas line and gas manifold; zero-pressure gas valves interposed in said gas lines, respectively; adjustable valves in said first gas lines, respectively, between said zero-pressure valves therein and said gas inlets of the respective mixers to permit individual adjustment of the air-gas mixture for each burner; and control means operable to cause simultaneous opening and closing of said first valves.

13. A service unit for action and solder-melt gas burners along a can body line, with the action burners having pilot-lighted main flames and the solder-melt burners heating different zones of a solder bath, comprising an upright cabinet; and an assembly mounted and contained in said cabinet and including, first and second groups of air-gas mixers associated with said action and solder-melt burners, respectively, of which the mixers of said first group exceed the number of action burners by one and the mixers of said second group are equal in number to said solder-melt burners, and each mixer has air and gas inlets and an outlet, first and second air and gas manifolds, air and gas mains connected with said air manifolds and with said second gas manifold, respectively; a gas conduit connecting said gas main with said first gas manifold, one first air line connecting said first air manifold with the air inlet of one mixer of said first group, other first air lines connecting said first air manifold with the air inlets of the remaining mixers, respectively, of said first group, first valves interposed in said gas conduit and in said other first air lines, respectively, one first gas line connecting said gas main with the gas inlet of said one mixer of said first group, other first gas lines connecting said first gas manifold with the gas inlets of said remaining mixers, respectively, of said first group, second air lines connecting said second air manifold with the air inlets of the mixers, respectively, of said second group, second gas lines connecting said second gas manifold with the gas inlets of the mixers, respectively, of said second group, zero-pressure valves interposed in all of said first and second gas lines, air-gas mixture supply conduits leading from the outlets of all mixers, respectively, air-flow valves interposed in said second air lines, respectively, being responsive to temperature variations of the solder in the respective bath zones to regulate the volumetric air flow to the respective mixers of said second group for keeping the solder temperatures in the respective bath zones uniform, and control means operable to cause simultaneous opening and closing of said first valves, with said mains and supply conduits projecting outside said cabinet and there have releasable conduit connector means.

References Cited by the Examiner
UNITED STATES PATENTS

| | | | |
|---|---|---|---|
| 2,517,869 | 8/1950 | Grapp | 263—40 |
| 2,620,174 | 12/1952 | Passafaro | 263—6 |
| 2,838,296 | 6/1958 | White | 263—3 |
| 3,095,889 | 7/1963 | Barroll et al. | 137—625.11 X |
| 3,099,437 | 7/1963 | Bloom | 158—119 X |

JAMES W. WESTHAVER, *Primary Examiner.*

FREDERICK L. MATTESON, JR., *Examiner.*

D. A. TAMBURRO, *Assistant Examiner.*